United States Patent [19]
Weil

[11] 4,200,429
[45] Apr. 29, 1980

[54] DEVICE FOR MAKING RECTANGULAR CUTS, PRINTS AND/OR STAMPINGS

[76] Inventor: Hans H. Weil, 8 Tullgatan, Malmö, Sweden, S-211 28

[21] Appl. No.: 904,536

[22] Filed: May 10, 1978

[51] Int. Cl.2 ........................ B29C 17/14; B26D 5/10; B26D 7/26

[52] U.S. Cl. ...................................... 425/295; 83/522; 83/555; 83/563; 83/565; 83/622; 425/306; 425/385

[58] Field of Search ................. 83/565, 618, 563, 622, 83/525, 523, 550, 553, 555, 558, 522; 425/295, 306, 383, 385

[56] References Cited

U.S. PATENT DOCUMENTS

| | | | |
|---|---|---|---|
| 371,400 | 10/1887 | Wickham | 83/618 |
| 2,722,731 | 11/1955 | Le Tarte | 83/553 |
| 3,881,379 | 5/1975 | Stumpf | 83/565 |
| 4,117,751 | 10/1978 | Inone | 83/565 |

*Primary Examiner*—James B. Lowe
*Attorney, Agent, or Firm*—Burns, Doane, Swecker & Mathis

[57] ABSTRACT

Device for making rectangular cuttings or embossings in cardboard or another sheet material for preparing passepartout frames, in the form of a block with four fixtures, which include one or more, preferably four, cutting or embossing members, which in the operative position are in contact with the underlying material form the sides of a prism or a truncated pyramid.

15 Claims, 9 Drawing Figures

DEVICE FOR MAKING RECTANGULAR CUTS, PRINTS AND/OR STAMPINGS

Figure 1:
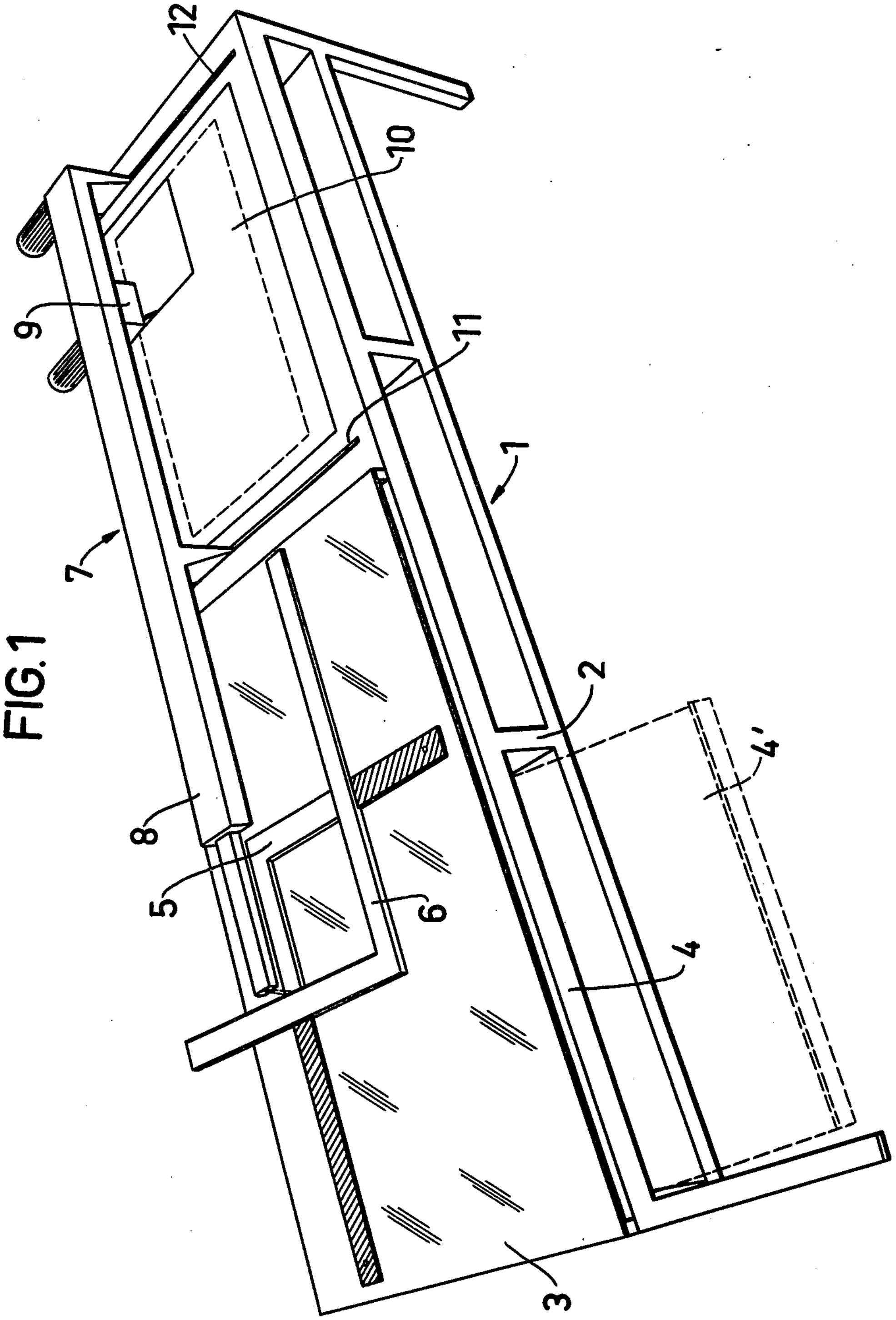

This invention relates to a device for making rectangular cuts, prints and/or embossings. As is described in the following, the purpose of the invention is to simplify the making of frame-shaped drawings, ornamental edgings and/or cuts from plane materials, such as paper, cardboard, plastic or metal foil, fabric etc. The object of the invention is an adjustable templet for drawing or cutting and a holder for cutting and stamping or a combination thereof, which is arranged in an adjustable frame.

Various arrangements to achieve window-shaped cuttings from cardboard or other plane materials have previously been described. They are designed to make possible the production of so-called passepartouts for framing of artistic and/or graphic works of art. However, as before, the cutting process together with the preparative measurement is time-consuming and requires great attention, otherwise errors and inaccuracies might occur, which in these cases would destroy important aesthetical impressions of the framed work of art.

However, regarding the manufacture of products concerned here, most of which seldom have the same dimensions, great difficulties are involved with a completely mechanical manufacturing process, especially when precision within certain precise limits is to be maintained, particularly when beveled borders are required.

An embarassing error that is difficult to avoid is that the cutting groove is often cut beyond the frame into the field of the remaining material. The essence of the process is therefore making the completely distinct connection of the various cuts in the interior frame angle.

According to the present invention the relative position of the four cuts, which always form a rectangle—even if having different sizes—is rectangularly performed for all intended sizes and, consequently, for all cut lengths, and in this way the exact joining of the cutting edges, which form a constant angle for all sizes, is obtained once and for all. The always delicate connection of the cuts is, so to speak, built-in in the instrument and cannot fail. The construction according to the present invention is characterized by four knife fixtures, which are arranged around a center located at a stationary point on the knife holder, rectangularly to each other and with their edges either parallelly prismatic, but preferably, alternatively, inclined relative to each other. In the latter case the knives will form a square pyramid or a truncated pyramid. Alternatively, or in combination with what is stated above, ink bearing materials, stamps or stamp rolls can be arranged, and corresponding ornamental corner stamps diagonally to that.

Four or less knives can be arranged stationary or movably in the blade fixtures disposed in the way described, or one single knife may be placed in one of the four fixtures so that after completion of each one of the four cutting stages and before the beginning of the following cutting stage the knife can be replaced so that its exact position is secured with respect to the cut completed at that moment. The same applies to ink bearing pencils and/or decorative stencils.

The change of position can, according to the invention, be controlled mechanically with, the knife being lifted from its previous cutting position and brought into the starting position of the cut to be made through the material to be cut, when a corresponding release knob or the like is actuated. Alternatively, two, three or four knives may be present, and similar to the way described for one knife, are brought consecutively from inactive position into working position and then again are lifted into inactive position. A further embodiment of the invention consists in the combination of the holder with a templet frame or an adjustable modular frame in such a way that the knife is automatically released as soon as the holder hits the edge or another preformed element of one of the frame rulers arranged for release, as described below.

This further embodiment differs in an advantageous way from the previous methods substantially through its simplified operation even when operated manually. In addition to the holder described above it consists essentially of another two parts: an adjustable frame in two parts, more specifically of two angular pairs of rulers, which are rigidly connected vertically to each other in the angle apex and are covered with locking structures in such a way that the pairs can form different sizes movable relative to each other under constant maintenance of vertical position and, due to the locking of the structures in a plane position, cannot be lifted from each other. Along these frame parts the holder described above runs preferably on rails to which a bearing groove in the holder corresponds. The groove can be provided with ball bearings or slide bearings.

To obtain continuous cutting of all four edges of a window to be cut, the four blades are arranged to be in contact with each other and are characterized in that their contact edge corresponds to the intended angular position of the passepartout corners to be obtained, which is the most important precision mechanics of the device.

The special shape of the blades, viz. with a long cutting edge instead of a point, a cutting edge which is tapered into two or more points, has three different purposes. Firstly it will simplify the rectilinear guiding of the cut. Secondly this design will permit the cuts to touch each other at their end points without cutting so deeply into the underlayer under the material to be cut, as would be necessary with knives terminating in one point. The blades form a pyramid, in order to achieve contact of the cuts. Thirdly, part of the slide motion of the holder is spared by the extended knife edge which is of a great advantage with respect to the placing of the mechanical parts, especially when the device is to be constructed for mechanical operation. If the knife should have only one straight edge, a much greater force would be required for piercing the material; the series of points eliminates this difficulty. The cutting process always starts with this piercing of the material.

The exterior of the holder can be formed to fit the shape of a grasping hand. It can be used for all sizes and formats desired. This can be achieved by only adjusting the frame. The change of size of the rectangular frame can either take place by displacement of the pairs of frame rulers or by separation and renewed joining thereof. It is an advantage for precision in the coaction of the ruler parts that such a separation only can take place under bending. As long as they are are flat-positioned, they cannot be separated from each other against the operator's will, but will only be displaced towards each other when the desired dimensions are obtained. In this way either a sliding or a stepwise change of size and shape is possible to obtain. Structured frame rulers of this kind can easily be produced from plates, e.g. such as PVC, which can be stamped in a corresponding way under heating. The structural element can be formed according to the shape of a sinoidal curve with higher inclined sides. In this way a form of "interlocking" part is created. Thus, interlocking parts consist of thickening portions, which fit into each other, but cannot be fitted together without deformation, e.g. pressure etc. The pieces can be slideably combined and give a guarantee of good precision. They can be stamped or cast on both sides in such a way that the structures on one surface of the rulers run vertically to those of the other side. The result is then that in one case, a series of similar but substantially different formats are obtained, but in the other case, i.e. through sliding contact of the opposite surfaces with each other, running format changes between standing and lying formats of the same order of magnitude are obtained. The condition for this is that the sliding structure grooves in one case run parallelly to the angle partition line of the frame corners and in the other case perpendicularly to that line.

Figures 2, 3:
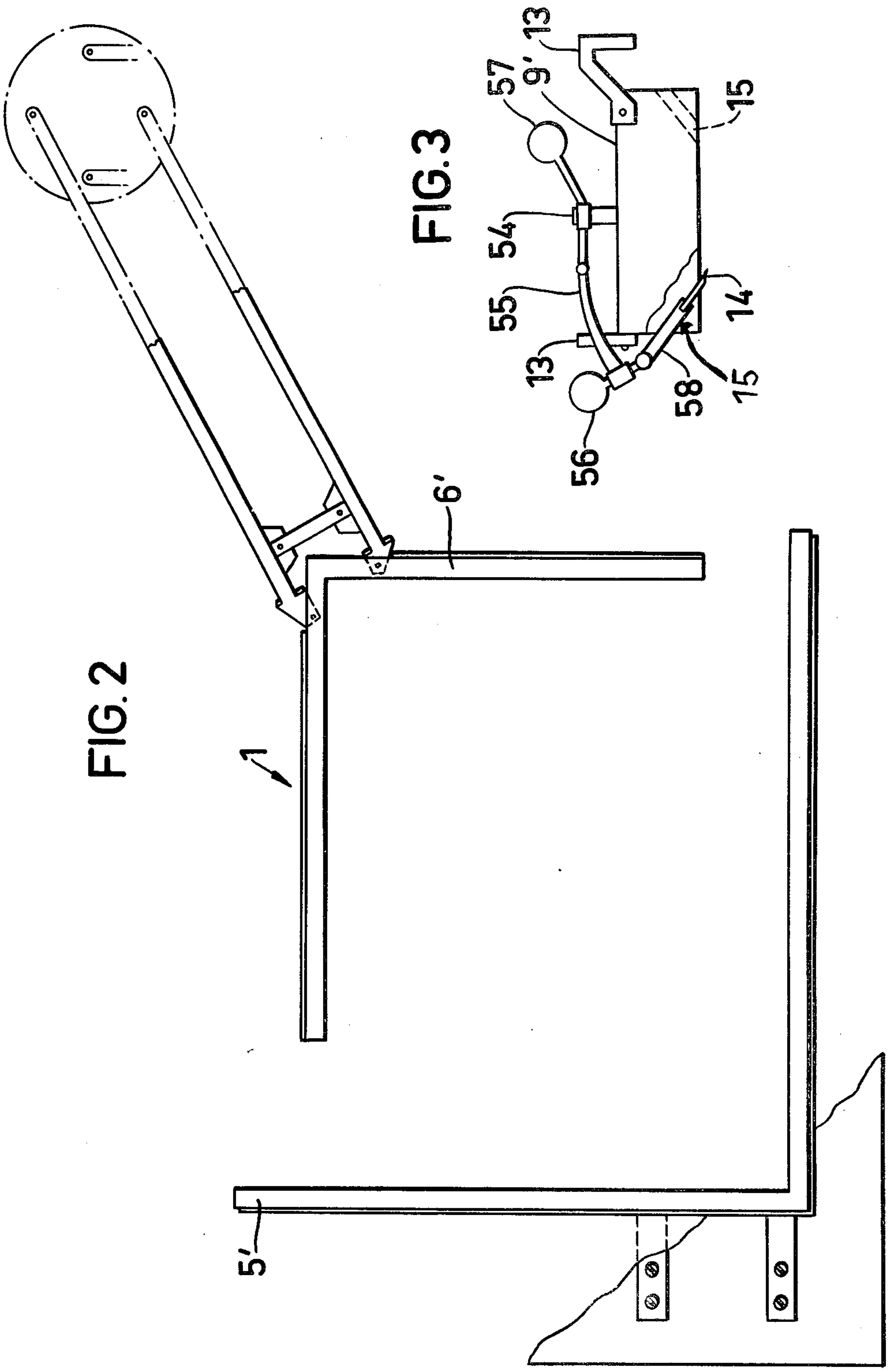
Figure 5:
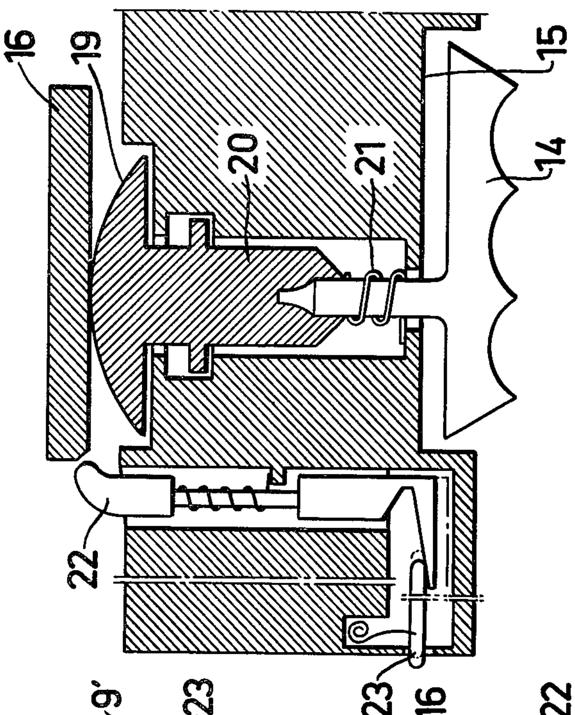
Figure 6:
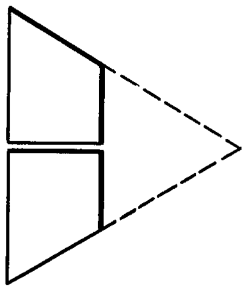
Figure 4:
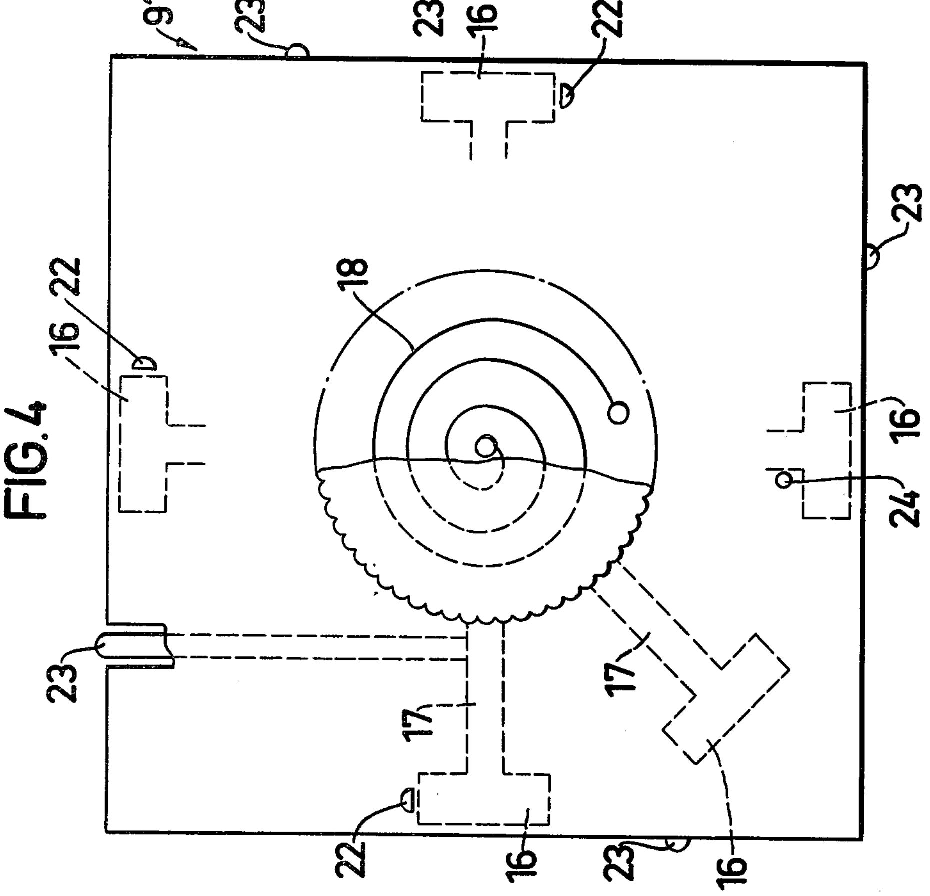
Figure 7:
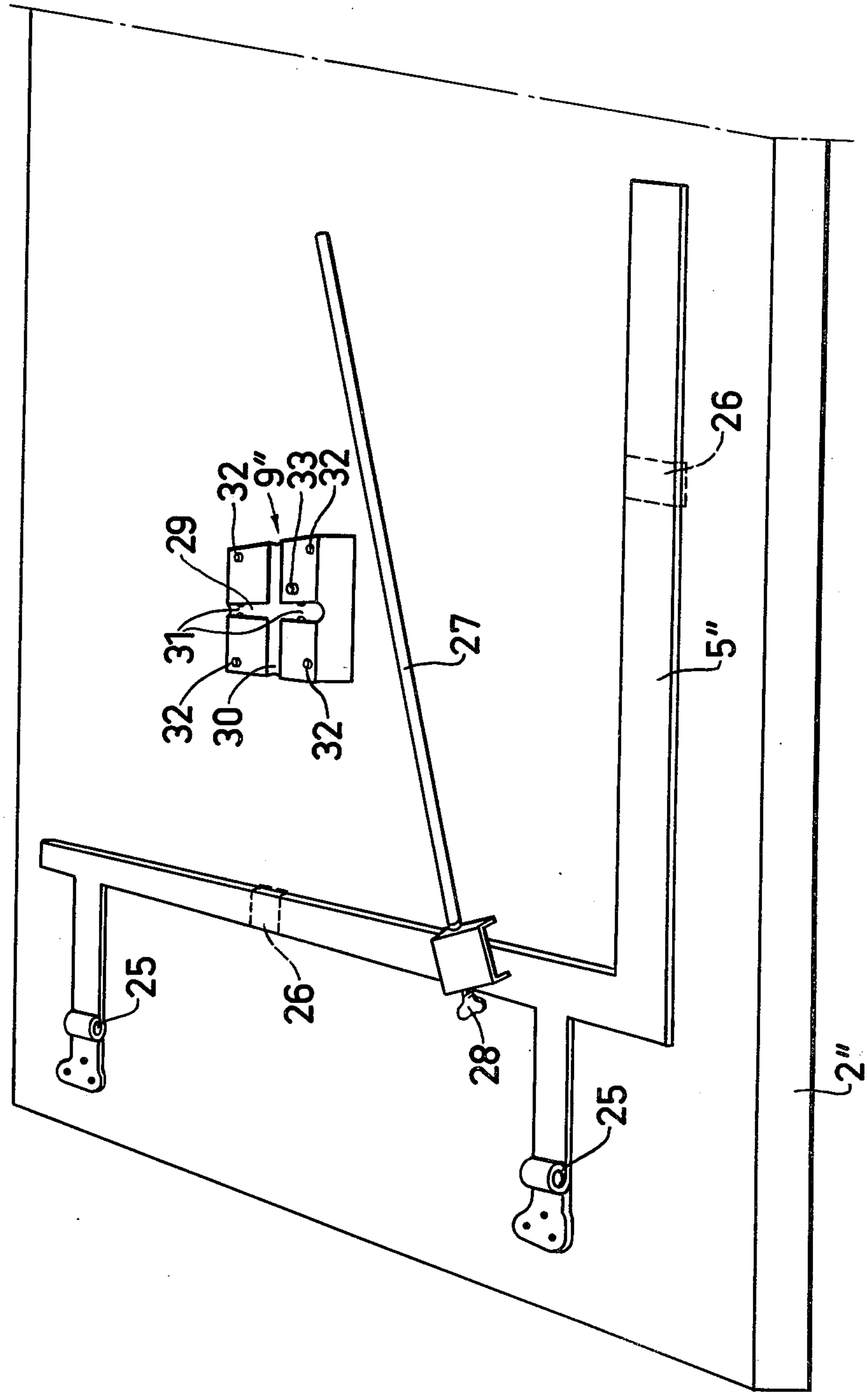
Figure 8:
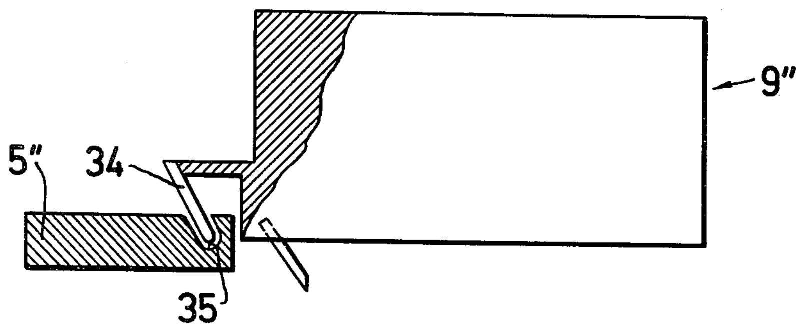
Figure 9:
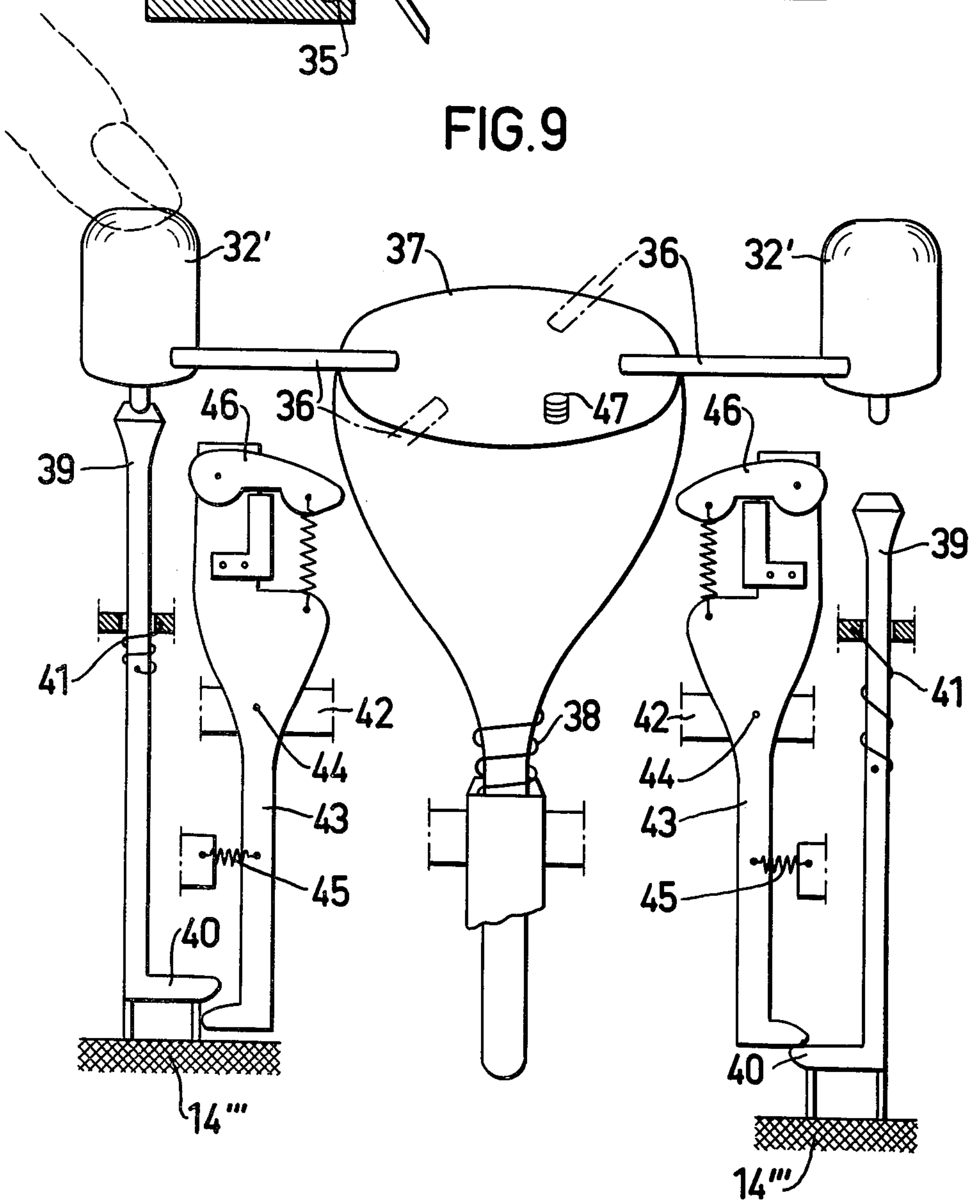

Illustrative examples of the invention will be described below more in detail with reference to the enclosed drawings, in which FIG. 1 is a perspective view of an embodiment according to the invention for making rectangular cuts and/or rectangular markings, FIG. 2 is a view from above of two angular rulers cooperating with each other, FIG. 3 is a side view of a cutting block according to the invention, FIG. 4 is a view from above, partly in section, on an enlarged scale, of the cutting block according to FIG. 3, FIG. 5 is a component part of the cutting block according to FIG. 4, FIG. 6 shows schematically the knives of the cutting block in operative position, FIG. 7 is a perspective view of another embodiment of a device according to the invention, FIG. 8 shows a connection between a cutting block and an angular ruler, partly in section, and FIG. 9 shows schematically an embodiment of the release mechanism.

In FIG. 1 a device for cutting passepartout windows is shown. The device 1 consists of a table 2, on which a glass plate 3 is arranged, which can be raised above the plate 4 of the table 2, under which the original can be placed. Alternately, the original, can be placed above 4', and be pressed up from below. Two angular rulers 5 and 6 respectively, are arranged on the glass plate 3, of which the ruler 5 is stationary and the ruler 6 is displaceable relative to the ruler 5, in order to vary the size of the window, which is formed by these two rulers together.

A cutting device 7 is mounted on the side of the glass plate 3 on the table plate 4, which includes a telescopic arm 8, the end of which is actuated photoelectrically to follow the contour of the window. Thereafter a cutting block 9, displaceably arranged on the arm 8, carries out such a motion that the knives disposed in the cutting block 9 cut out a window in a pasteboard 10, the size of the window in the pasteboard 10 corresponding to the window formed by the rulers 5 and 6.

When the window sides, which run in the longitudinal direction of the table 2, are cut, the cutting block 9 is displaced along the arm 8, while when cutting the window sides running in the transverse direction of the table 2, the cutting block 9 is displaced together with the arm 8 in grooves 11 and 12 in the table 2. The guiding of the knives is carried out electrically in this embodiment.

In FIG. 2 a simpler variant of a device for cutting out passepartout windows is shown, which consists of two angular rulers 5' and 6', of which the ruler 5' is stationary, while the ruler 6' is parallelly displaced via parallel rods and a turn-plate, so that the legs of the rulers 5' and 6' always hit each other at a correct angle. The stationary ruler 5' can be tilted upwards so that an original can be introduced under the ruler 5' and adjusted so that the legs of the ruler 5' form two sides of the window to be cut. After this the ruler 6' is adjusted so that a closed window is obtained. The original is then removed and a window is cut out in a pasteboard, which is introduced under the rulers 5' and 6' or, alternatively, was introduced in advance.

Cutting is carried out by means of the cutting block 9' shown in FIG. 3, which has four rotatable hooks 13 attached thereto. The cutting block 9' includes, moreover, four knife fixtures 15, one of which is shown with a knife 14 in operative position, while the other fixtures are empty. Alternatively, four knives can be used, so that in this case the remaining three knives are in inactive position in their fixtures in the cutting block 9'. In cutting, which is started in a corner of the window, the cutting block 9' is hooked to the ruler 5' or 6' by means of one of the hooks 13 so that the cutting block is held in position with respect to the ruler 5' or 6'. After this the knife 14, which corresponds to the hooked hook 13, is pressed through the pasteboard, and the cutting block is displaced along one leg of the ruler to the following corner, where the attached hook is released and the following hook is actuated. The pressed down knife is raised to inactive position, and the following knife is pressed through the cardboard etc. In FIG. 3, moreover, a shaft 54 is shown, around which an arm 55 can be adjusted by means of the handles 56, 57, and the knife holder 58 can be pressed down and through the underlayer.

The construction and the way of operation of a cutting block 9' are described more in detail with reference to FIGS. 4 and 5. The cutting block 9' comprises consequently four knives 14, which in inactive position are pushed upwards into their fixtures 15. The fixtures 15 are inclined relative to each other, so that when all four knives 14 are moved down to cutting position they form the sides of a truncated pyramid, which is schematically indicated in FIG. 6. This means, as already mentioned, that the risk of a corner not being perfectly cut is eliminated. This presupposes that the requirements as to the tolerances of the positions of the knives must be high.

A pressure plate 16 is pivotally connected via an arm 17 with the centre of the cutting block 9'. A plate spring 18 exerts a turning force on the arm 17, e.g. in clockwise direction. When turning the pressure plate 16 relative to the centre of the cutting block 9' this will in the range of each of the knives 14 get into contact with a head 19 of a guide member 20, which is raised above the upper surface of the cutting block 9', said member being rigidly connected with the knife 14. At a continued turning of the pressure plate 16 this is pressed against the force of a compression spring 21 to the cutting position shown in FIG. 5 together with the head 19 and consequently the knife 14. A locking means 22 guarantees that the pressure plate 16 stops above the head 19 and does not continue its motion past the head.

When the cutting block 9' is displaced from one corner in the window formed by the rulers 5' and 6', FIG. 2, and its associated knife 14 enters the position shown in FIG. 5, cutting of the underlying pasteboard takes place. When the cutting block 9' arrives at the following corner of the window a front end of a rod member 23 gets into contact with the ruler, along which the following cut is to be made. The rod member 23 is then displaced, against the action of a spring, backwards relative to the direction of motion of the cutting block 9', the locking means 22 being pressed down towards the underlayer against the action of a spring, releasing the pressure plate 16. Due to the action of the plate spring 18 the pressure plate is turned to the following knife range, where it again enters the position shown in FIG. 5.

The lowermost position of the pressure plate 16 shown in FIG. 4 is the final position for a window cutout. The stop means 24, which locks the pressure plate in this position, is not released in the same way as the locking means 22 but is manually operated. The tension of the plate spring 18, which will be reduced with the turning of the pressure plate, is restored by being wound up like a spiral spring.

In FIG. 7 a further embodiment of a device 1" for cutting out passepartout windows is shown. The device 1" consists of a table 2" and an angular ruler 5" arranged on the table, which is attached to the table 2" by means of joints 25. The ruler 5" is treated with an anti-slide agent on its underside and has displaceable indicating means 26 along the legs of the rulers. The device 1" has, moreover, a sliding rod 27, which can be temporarily attached e.g. by means of a clamp 28 in different positions on the ruler 5". The device 1" further includes a cutting block 9", which contains four knives 14 like the aforesaid cutting blocks, which are arranged in the form of the pyramidic truncated cone described above. The cutting block 9" has moreover two locking grooves 29 and 30, which are arranged transversely to each other. In the grooves 29 and 30 spring locks 31 are arranged. The cutting block 9" is further provided with four switch knobs 32 to displace the knives 14 out of the inactive position (as better seen in FIG. 9) into the working position, a locking mechanism however guaranteeing that only one knife enters operating position. In order to lock all knives 14 in inactive position, which might be necessary not to risk damage to the original, a safety knob 33 is arranged.

When using the device 1" it is operated in the following way. The original is moved under the angular ruler 5" and the indicating means 26 are adjusted to mark the size of the window. The cutting block 9" is then arranged in the corner of the ruler 5" and connected with the leg of the ruler 5" in a suitable way, e.g. as is described below with reference to FIG. 8, along which leg cutting is to be carried out. The knife 14 facing this leg is actuated by means of its associated switch knob to enter its active position and cutting is carried out along one leg of the ruler. The slide rod 27 might possibly be arranged on the other leg in order to improve the guiding of the cutting piece 9" additionally. When the cutting block 9" has arrived at one of the indicating means 26, the cutting along the leg ceases, and the slide rod 27 is attached to that leg, by means of the clamp 28, along which cutting took place, the rod 27 being pressed down in one of the grooves 29 or 30 and locked therein. The knife, which is now to enter an active position, is pressed down through the pasteboard while the knife, which was in active position, enters its inactive position at the same time. One knife is consequently always in active position. Additionally no displacement of the cutting block 9" transversely to the longitudinal direction of the ruler 5" or the slide rod 27 takes place. The switching mechanism of the knives 14 is so to speak based on the same principle as the shifting of different colour pencils in a ball-pen of multi-colour type. The cutting block 9" is then displaced along the slide rod 27, until the desired cutting length has been obtained by reading markings on the slide rod 27, after which the slide rod 27 (not illustrated) is attached to the other leg of the ruler 5".

In FIG. 8 an example is shown, which illustrates how a cutting block 9" can be loosely connected with a leg of an angular ruler 5". A sliding pin 34 fitted in the cutting block engages a guide groove 35 in one leg of the ruler 5", the pin 34 and the groove 35 having such an inclination that the risk of the slide pin 34 coming out of the groove 35 is very small. The slide pin 34 is preferably brought into engagement with the groove at the same time as the associated knife 14 enters its operating position.

In FIG. 9 a release mechanism for four knives is shown, which has four switch knobs 32', of which only two are shown in FIG. 9. The switch knobs 32' have bolts 36 projecting laterally to the centre of the mechanism, which extend over the upper surface of a round head 37, which is displaceable downwards against the action of a compression spring 38. Sliding members 39 are arranged under the switch knobs 32', which are provided with stop tongues 40. The sliding members 39 are at their lower ends provided with knives 14''' or the like. The sliding members 39 are consequently displaceable downwards with their knives 14''' by means of the switch knobs 32' against the action of a tension spring 41. Four locking levers 43 are arranged on a stand 42 of the mechanism via shafts 44 and are rotatable around the shafts against the action of a spring 45. The levers 43 are provided with arms 46 at their upper ends, which arms can be turned upwards and are intended for cooperation with the round head 37. Moreover, on the round head 37 a security knob 47 is arranged.

The mechanism has the following way of operation. In the position according to FIG. 9 the right knife 14''' is in active position, while the other knives are in inactive position. When the left knife 14''' is now actuated to enter its active position in such a way that the left slide member 39 is displaced downwards by means of the left switch knob 32', the round head 37', which is likewise downwardly displaced, presses the lever plates 43 via the arms 46 outwards, the right knife returning to inactive position. The stop tongue 40 of the left knife passes the lower part of the locking lever 43, and, at the same time, the right knife is released. The left arm 45 then follows the contour of the round head 37 at the further downward motion of the left member 39 and consequently also the round head 37, the locking lever 43 moving around the centre of the mechanism and locking of the left knife 14''' taking place. At release of the knob 32' and, as a consequence of this, upward motion of the round head through the action of the spring 38 the left arm 46 is turned aside upwards, the round head 37 not influencing the position of the locking lever 43 on its way upwards. After this the left arm 46 returns to its starting position through the action of a spring.

By depression of the security knob 47 all knives 14''' can be caused to enter inactive position.

Several constructive alternatives according to the invention offer themselves. Mechanisms are known in drawing equipment, which separate the motion of e.g. a drawing pencil into its vertical and horizontal components. The combination of the present invention with such a mechanism for guiding the holder is possible as a construction alternative according to the invention, the scope of which is consequently not exceeded by this.

It is also within the scope of the intended invention to use parts thereof separately in case only the characteristic features described above of, on one hand, the holder and, on the other hand, the frame rulers are present. Such parts can be of use on the drawing board and in picture reproducing connections without exceeding the inventive idea with this.

What is claimed is:

1. A device for making rectangular cuts in a sheet material which comprises four cutting members attached to respective fixtures in a cutting block and wherein each cutting member can be individually moved from an inactive position, in which the cutting member is not in contact with an underlayer of the sheet material to an active position, in which the cutting member is in engagement with the underlayer, the cutting members and fixtures being positioned so that planes of their surfaces coincide with the side faces of a truncated pyramid, and means for defining the direction of motion of the cutting block.

2. A device as claimed in claim 1, further comprising a control mechanism for moving only one cutting member into the active position at a time.

3. A device as claimed in claim 1, wherein the cutting members comprise knives which have an extended length in the cutting direction, and having cutting edges which taper into two or more points.

4. A device as claimed in claim 1, wherein the means for defining the direction of motion of the cutting block comprises an angular ruler and a sliding rod which can be attached to the ruler, and two grooves in the cutting block for receiving the sliding rod.

5. A device according to claim 1 including an embossing member mounted beside each cutting member for embossing the sheet material in combination with the cutting procedure.

6. A device as claimed in claim 1, further comprising means for moving each cutting member into the active position, said means including a rotating arm which permits only one cutting member to be brought into the active position at a time.

7. A device as claimed in claim 6, wherein the rotating arm includes locking means for locking the rotating arm in a position above the cutting members and a rod elememt cooperating with the locking means to release the rotating arm.

8. A device as claimed in claim 7, wherein the rod element releases the locking element when the rod element comes into contact with the means for defining the direction of motion of the cutting block.

9. A device as claimed in claim 8, wherein the means for defining the direction of motion of the cutting block comprises frame rulers having elements positively engaging each other.

10. A device for making rectangular cuts comprising:
a cutting block;
four knife fixtures provided in the cutting block;
four cutting members movably mounted in the fixtures;
planes of each of the fixtures and the cutting members being inclined with respect to one another with the planes together forming a truncated pyramid; and,
means for guiding the cutting block.

11. A device as in claim 10 wherein each of the cutting members includes a knife having an extended length in a cutting direction, each of said knives having a cutting edge which tapers into two or more points.

12. A device as in claim 10 further comprising:
means for moving the cutting members from an inactive position within the cutting block to a cutting position in contact with a work piece.

13. A device as in claim 12 wherein the means for moving the cutting members includes:
a rotating arm attached at one end to a center of the cutting block and provided with a pressure plate at the other end, the pressure plate engaging one cutting member at a time as the arm is rotated.

14. A device as in claim 13 wherein the means for guiding the cutting block includes:
first and second right angled frame rulers adjustably fixable with respect to one another to form a desired rectangular shape.

15. A device as in claim 14 including:
locking means for locking the pressure plate in engagement with one of said cutting members, the locking means being associated with the pressure plate; and
an elongated rod connected to the locking means to release the locking means when the rod abuts one of the frame rulers.

* * * * *